US012795707B2

(12) United States Patent
Hassan et al.

(10) Patent No.: US 12,795,707 B2
(45) Date of Patent: Nov. 10, 2026

(54) METHODS AND APPARATUSES FOR RADIO COMMUNICATION

(71) Applicant: Robert Bosch GmbH, Stuttgart (DE)

(72) Inventors: Khaled Shawky Hassan, Sarstedt (DE); Maximilian Stark, Hamburg (DE); Oscar Dario Ramos Cantor, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 455 days.

(21) Appl. No.: 18/356,059

(22) Filed: Jul. 20, 2023

(65) Prior Publication Data

US 2024/0049268 A1 Feb. 8, 2024

(30) Foreign Application Priority Data

Aug. 4, 2022 (EP) .................................... 22188798

(51) Int. Cl.

*H04W 72/52* (2023.01)
*H04W 24/08* (2009.01)
*H04W 72/04* (2023.01)
*H04W 72/0446* (2023.01)

(52) U.S. Cl.

CPC ........... *H04W 72/52* (2023.01); *H04W 24/08* (2013.01); *H04W 72/04* (2013.01); *H04W 72/0446* (2013.01)

(58) Field of Classification Search

CPC ..... H04W 72/52; H04W 72/04; H04W 24/08; H04W 72/0446; H04W 72/0453; H04B 7/204

See application file for complete search history.

(56) References Cited

U.S. PATENT DOCUMENTS

| | | | | |
|---|---|---|---|---|
| 11,503,615 | B2 * | 11/2022 | Hu | H04W 72/0446 |
| 2010/0202415 | A1 | 8/2010 | Ansari et al. | |
| 2019/0279113 | A1 * | 9/2019 | Liu | G06N 20/00 |
| 2021/0204300 | A1 * | 7/2021 | Hu | H04B 7/18513 |
| 2024/0049268 | A1 * | 2/2024 | Hassan | H04W 72/52 |
| 2025/0294550 | A1 * | 9/2025 | Khoshnevisan | H04B 7/0413 |

OTHER PUBLICATIONS

Morsy, et al.: "Cross-Layer Adaptive Resource Allocation Algorithm For Wireless Communications Networks," 2008 IEEE Global Telecommunications Conference [IEEE GLOBECOM 2008], USA, pp. 1-5, XP031370725.

* cited by examiner

*Primary Examiner* — Raj Jain

(74) *Attorney, Agent, or Firm* — NORTON ROSE FULBRIGHT US LLP

(57) ABSTRACT

A method for operating a first apparatus. The method includes: collecting at least one first radio traffic data set that is associated with a utilization of at least one radio channel; training a machine-trainable function based on the collected at least one first radio traffic data set; collecting at least one second radio traffic data set, which is associated with the utilization of the at least one radio channel, wherein the second traffic data set is different from the first data set; determining, using the machine-trained function, at least one utilization scheme associated with the at least one radio channel based on the at least one second radio traffic data set; allocating at least one radio resource on the at least one radio channel according to the determined utilization scheme; and transmitting data via the at least one allocated radio resource of the at least one radio channel.

22 Claims, 11 Drawing Sheets

METHODS AND APPARATUSES FOR RADIO COMMUNICATION

CROSS REFERENCE

The present application claims the benefit under 35 U.S.C. § 119 of European Patent Application No. EP 22 18 8798.7 filed on Aug. 4, 2022, which is expressly incorporated herein by reference in its entirety.

FIELD

The present invention is directed to methods and apparatuses for radio communication.

SUMMARY

The problems of the prior art may be solved by a method, a first apparatus, another method, and by a second apparatus, according to the present invention.

An aspect of the present invention is directed to the following subject-matter: A method for operating a first apparatus comprising: collecting at least one first radio traffic data set that is associated with a utilization of at least one radio channel; training a machine-trainable function based on the collected at least one first radio traffic data set, wherein a machine-trained function is obtained; collecting at least one second radio traffic data set, which is associated with the utilization of the at least one radio channel, wherein the second traffic data set is different from the first data set; determining, using the machine-trained function, at least one utilization scheme associated with the at least one radio channel based on the at least one second radio traffic data set; allocating at least one radio resource on the at least one radio channel according to the determined utilization scheme; and transmitting data via the at least one allocated radio resource of the at least one radio channel.

Advantageously, according to an example embodiment of the prenset invention, two disjoint radio nodes using the same radio channel have access to concurrently or simultaneously learned comparable results for radio access in synchronized fashion. This is the basis for conducting resource allocation escalation according to a plan or pre-configuration in harmonized fashion. Control signaling overhead can be reduced increasing spectrum efficiency. Moreover, the radio domain benefits from the distributed synchronized determination and allocation of radio resources, which can be also seen as a prediction, which can be used by further radio functions. Furthermore, the radio resources can be allocated on the shared radio channel without a central granting procedure in form of resource allocation signaling.

Going further, an example embodiment of the present invention may be advantageous by that the training is based on first traffic information of monitored transmissions via the at least one radio channel and based on state information associated with the monitored data transmissions.

According to an example embodiment of the present invention, advantageous is, for example, that the determining of the at least one utilization scheme is based at least on second traffic information, especially different from the first traffic information.

Benefits may be achieved by that the method further comprises: receiving at least one rectification indicator indicating at least one change associated with at least one of the training configuration, the collecting configuration, the function execution configuration, and the utilization scheme type configuration; and applying the at least one indicated change.

According to an example embodiment of the present invention, the rectification indicator advantageously indicates that the trained functions on both sides are not sufficiently synchronized and need to be adapted or reconfigured.

Going further, an example embodiment of the present invention is advantageous by that the method further comprises: transmitting, in a configuration mode, at least one capability indicator.

An advantageous example embodiment of the present invention is characterized by that the method further comprises: receiving, for example as a response to the transmitted at least one capability indicator, a training configuration; wherein the training of the machine-trainable function is configured according to the received training configuration.

Advantageously, according to an example embodiment of the present invention, the function selection information mandates a certain model/function or prefer certain AI/ML algorithms.

An example embodiment of the present invention is characterized by that the method further comprises: receiving, for example as a response to the transmitted at least one capability indicator, a collecting configuration; wherein the collecting is configured according to the received collecting configuration.

Advantageously, according to an example embodiment of the present invention, data collection at the side of UE is controlled centrally, for example by a gNB that provides the collecting configuration to the UE.

An example embodiment of the present invention is characterized by that the method further comprises: receiving, for example as a response to the transmitted at least one capability indicator, a function execution configuration; wherein the determining of the at least one utilization scheme is configured according to the received function execution configuration.

Advantageously, according to an example embodiment of the present invention, how the trained function is executed at the side of UE is controlled centrally, for example controlled by a gNB that provides the function execution configuration.

Benefits are achieved by that the method according to an example embodiment of the present invention further comprises: receiving, for example as a response to the transmitted at least one capability indicator, at least one utilization scheme type configuration; and wherein the training is conducted based on the at least one received utilization scheme configuration.

Advantageously, according to an example embodiment of the present invention, gNB is able to confine the transmission scheme that is learned, for example in terms of categories like frequency usage scheme type, modulation and coding scheme type, etc.

An aspect of the present invention is directed to the following subject-matter: A first apparatus comprising at least one processor; and at least one memory including computer program code; the at least one memory and the computer program code configured to, with the at least one processor, cause the apparatus at least to perform: collecting at least one first radio traffic data set that is associated with a utilization of at least one radio channel; training a machine-trainable function based on the collected at least one first radio traffic data set, wherein a machine-trained function is obtained; collecting at least one second radio traffic data set, which is associated with the utilization of the at least one radio channel, wherein the second traffic data set is different from the first data set; determining, using the machine-trained function, at least one utilization scheme associated with the at least one radio channel based on the at least one second radio traffic data set; allocating at least one radio resource on the at least one radio channel according to the determined utilization scheme; and transmitting data via the at least one allocated radio resource of the at least one radio channel.

An aspect of the present invention is directed to the following subject-matter: A method for operating a second apparatus comprising: collecting at least one first radio traffic data set that is associated with a utilization of at least one radio channel; training at least one machine-trainable function based on the collected at least one first radio traffic data set, wherein a machine-trained function is obtained; collecting at least one second radio traffic data set, which is associated with the utilization of the at least one radio channel, wherein the second traffic data set is different from the first data set; determining, using the trained function, at least one utilization scheme associated with the at least one radio channel based on the at least one second radio traffic data set; monitoring the at least one radio channel according to the determined utilization scheme for receipt of data.

Advantageously, according to an example embodiment of the present invention, two disjoint radio nodes using the same radio channel have access to concurrently or simultaneously learned comparable results for radio access in synchronized fashion. This is the basis for conducting resource allocation escalation according to a plan or preconfiguration in harmonized fashion. Control signaling overhead can be reduced increasing spectrum efficiency. Moreover, the radio domain benefits from the distributed synchronized determination and allocation of radio resources, which can be also seen as a prediction, which can be used by further radio functions. Furthermore, the radio resources can be allocated on the shared radio channel without a central granting procedure in form of resource allocation signaling.

A beneficial example embodiment of the present invention is characterized by that the training is based on first traffic information of monitored transmissions via the at least one radio channel and based on state information associated with the monitored data transmissions.

An advantageous example embodiment of the present invention is characterized by that the determining of the at least one utilization scheme is based at least on second traffic information, especially different from the first traffic information.

It is advantageous, for example, that the method further comprises: determining, using the trained function, at least one quality indicator that characterizes the quality of the determined utilization scheme associated with the at least one radio channel based on at least one third radio traffic data set comprising at least third traffic information of monitored transmissions via the at least one radio channel; determining at least one rectification indicator if the quality indicator passes a quality threshold; and transmitting the at least one rectification indicator indicating at least one change associated with at least one of the training configuration, the collecting configuration, the function execution configuration, and the utilization scheme type configuration.

The rectification indicator advantageously indicates that the trained functions on both sides are not sufficiently synchronized or do not qualify as providing a proper utilization scheme. Advantageously, the rectification indicator indicates both sides to be adapted or reconfigured.

For example, benefits can be achieved by that the method further comprises: receiving, in a configuration mode, at least one capability indicator.

A beneficial example embodiment of the present invention is characterized by that the method further comprises: transmitting, for example as a response to the received at least one capability indicator, a training configuration; wherein the training of the machine-trainable function is configured according to the transmitted training configuration.

Advantageously, the function selection information mandates a certain model/function or prefer certain AI/ML algorithms.

Advantages result from that the method further comprises: transmitting, for example as a response to the received at least one capability indicator, a collecting configuration; wherein the collecting is configured according to the transmitted collecting configuration.

Advantageously, data collection at both sides is conducted similarly.

A beneficial example embodiment of the present invention is characterized by that the method further comprises: transmitting, for example as a response to the received at least one capability indicator, a function execution configuration; wherein the determining of the at least one utilization scheme is configured according to the transmitted function execution configuration.

Advantageously, according to an example embodiment of the prenset invention, training at both sides is conducted nearly identically.

It is advantageous, for example that the method further comprises: transmitting, for example as a response to the received at least one capability indicator, at least one utilization scheme type configuration; and wherein the training is conducted based on the at least one transmitted utilization scheme configuration.

Advantageously, according to an example embodiment of the present invention, gNB is able to confine the transmission scheme that is learned at the side of UE, for example in terms of categories like frequency usage scheme type, modulation and coding scheme type, etc. By the provision of the utilization scheme type configuration, UE is able to train the trainable function to obtain a certain utilization scheme of an utilization scheme type.

An aspect of the present invention is directed to the following subject-matter: A second apparatus comprising at least one processor; and at least one memory including computer program code; the at least one memory and the computer program code configured to, with the at least one processor, cause the apparatus at least to perform: collecting at least one first radio traffic data set that is associated with a utilization of at least one radio channel; training at least one machine-trainable function based on the collected at least one first radio traffic data set, wherein a machine-trained function is obtained; collecting at least one second radio traffic data set, which is associated with the utilization of the at least one radio channel, wherein the second traffic data set is different from the first data set; determining, using the trained function, at least one utilization scheme associated with the at least one radio channel based on the at least one second radio traffic data set; monitoring the at least one radio channel according to the determined utilization scheme for receipt of data.

DETAILED DESCRIPTION OF EXAMPLE EMBODIMENTS

Figure 1:
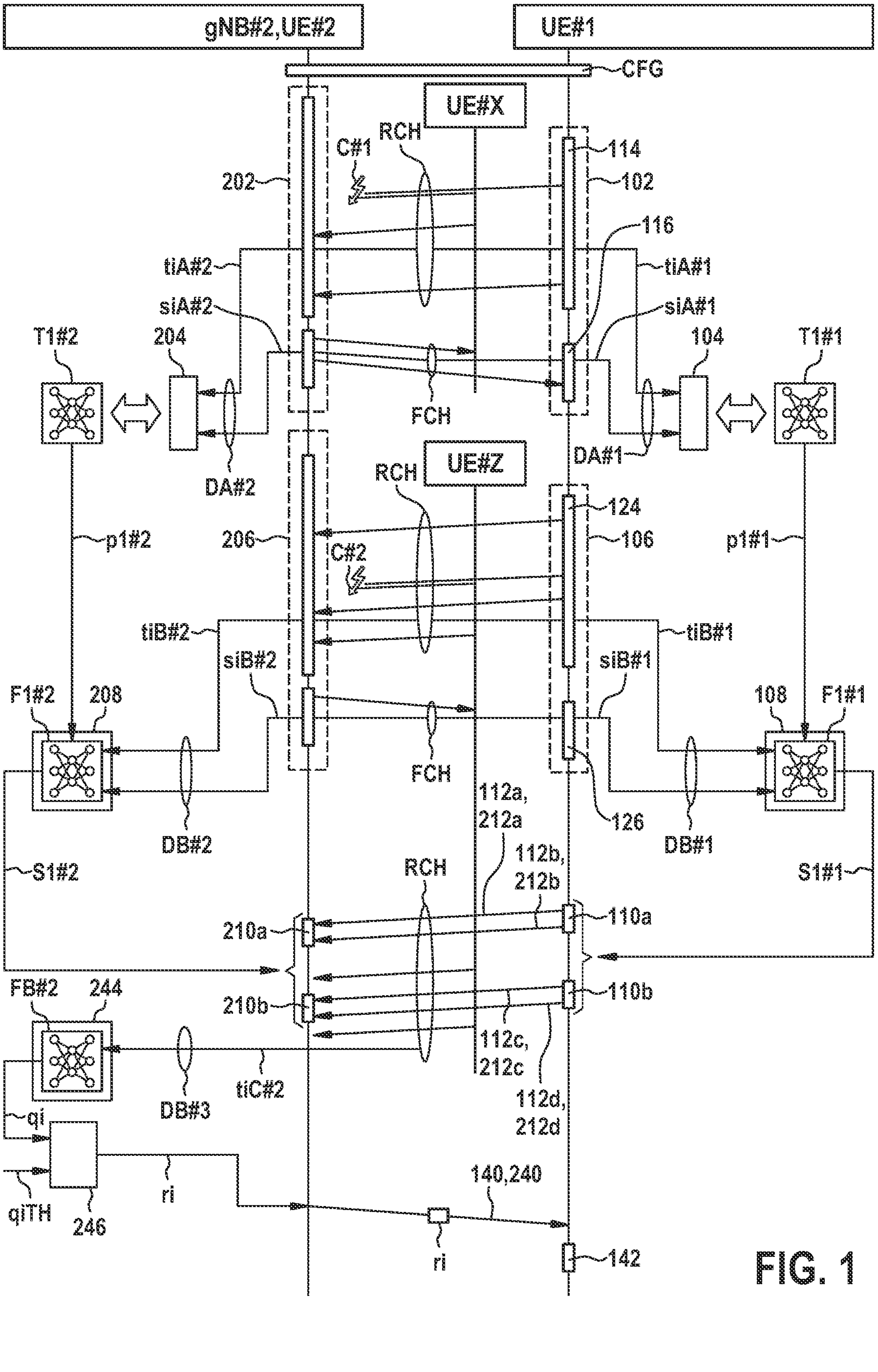
FIG. 1 depicts a schematic sequence diagram for operating apparatuses of a radio communications network, according to an example embodiment of the present invention.

FIG. 1 depicts a schematic sequence diagram. A method for operating a first apparatus UE#1 comprises: collecting 102 at least one first radio traffic data set DA#1 that is associated with a utilization of at least one radio channel RCH during a first period of time; training 104 a machine-trainable function T1#1 based on the collected at least one first radio traffic data set DA#1, wherein a machine-trained function F1#1 is obtained; collecting 106 at least one second radio traffic data set DB#1, which is associated with the utilization of the at least one radio channel RCH, during a second period of time different from the first period of time, wherein the second traffic data set DB#1 is different from the first data set DA#1; determining 108, using the machine-trained function F1#1, at least one utilization scheme S1#1 associated with the at least one radio channel RCH based on the at least one second radio traffic data set DB#1; allocating 110*a-b* at least one radio resource on the at least one radio channel RCH according to the determined utilization scheme S1#1; and transmitting 112*a-d* data via the at least one allocated radio resource of the at least one radio channel RCH.

Learning simultaneously at gNB and multiple disjoint other radio nodes, UEs, generates at least comparable results for the determiend utilization schemes S on both sides, wherein the utilization scheme S is intended for using the radio channel RCH via transmissions originating from the respective UE. Scheduling of radio resources is therefore achieved in a coordinated and aligned fashion.

According to an example, the first radio traffic data set DA#1, DA#2 and the second radio traffic data set DB#1, DB#2 further comprises sensor data characterizing an environment of the associated apparatus UE#1, gnB#2/UE#2.

According to an example, the first radio traffic data set DA#1, DA#2 further comprises offline training data, for example being provided by gNB#2/UE#2.

There is shown that the training 104 is based on first traffic information tiA#1 of monitored transmissions via the at least one radio channel RCH and based on state information siA#1 associated with the monitored data transmissions.

There is illustrated that the determining 108 of the at least one utilization scheme S1#1 is based at least on second traffic information tiB#1, especially different from the first traffic information tiA#1. In other words, tiA#1 and tiA#2 are determined at different points in time and are associated with different transmissions on the radio channel RCH.

The collecting 102, 106 comprises: collecting 116, 126, as part of the respective first and second radio traffic data set DA#1, DB#2, first and second state information siA#1, siB#1 that characterizes at least one respective first and second state associated with the plurality of transmissions on the radio channel RCH.

The second state information siA#1, siB#1 is determined by monitoring a feedback channel FCH, on which explicit feedback information is expected to be received at UE#1 or an implicit feedback information by no transmission is expected.

For example, the data representing the state information si#A1, si#B1 are collected from the processed transmission and/or reception of the transceivers of each node UE#1 and gNB#2/UE#2, wherein these data are either shared or assumed to be easily reproduced at each node disjointly e.g., ACK/NACKs shared or reproduced, CSI shared or reciprocity is exploited, power control parameters/value, etc. In other words, the state information represents at least a part of the radio traffic between UE#1 and gNB#2 over the radio channel.

The collecting 102, 106 comprises: collecting 114, 124, as part of the respective first and second radio traffic data set DA#1, DB#1, first and second traffic information tiA#1, tiB#1 that characterizes at least a plurality of transmissions on the radio channel RCH.

The first and second radio traffic data set DA#1, DA#2, DB#1, DB#2, for example, comprises transmissions on the radio channel RCH originating from UE#1 and from a further radio terminal UE#X. For example, a pair of transmissions from UE#1 and UE#X or from UE#1 and UE#Z result in a collision C#1, C#2 on the radio channel RCH. Using the trained functions F1#1, F1#2 reduces the risk of data collisions.

The apparatus gNB#2, UE#2 determines an implicit feedback that is not transmitted via the radio domain and an explicit feedback that is transmitted to UE#X and UE#1 via the feedback channel FCH. By way of the implicit or explicit feedback from gNB#2, UE#2, the UE#1 obtains knowledge about at least one of the collisions C#1, C#2 and about successful transmissions.

The method further comprises: receiving 140 at least one rectification indicator ri indicating at least one change associated with at least one of a training configuration tc, a collecting configuration cc, a function execution configuration fc, and a utilization scheme type configuration uc; and applying 142 the at least one indicated change. The applying 142 of the at least one indicated change involves at least one of the following: Changing the training configuration tc and train the trainable function according to the changed training configuration tc; Collecting first and second traffic information tiA#1, tiB#1 that characterizes at least a plurality of transmissions on the radio channel RCH according to the changed collecting configuration cc; Executing the trainable function according of the changed function execution configuration; and the training 104 is conducted based on the changed utilization scheme configuration uc.

The determined utilization scheme S comprises, for example, at least one of the following: Radio resource increase/decrease as part of pre-configured radio resources sets for an escalation/reduction procedure; Reducing or increasing the transmission rate; Change the rx-tx scheme high, low; Relaxing or tightening the transfer time interval; Increase or reduce the number of carriers, change frequency e.g., mmWave, change MIMO scheme, etc. The transfer interval is a time difference between two consecutive transfers of application data from an application via the at least one radio channel RCH. The survival time is the time that an application consuming a communication service may continue without an anticipated message. Age-of-information (AoI) or peak of information is a metric used to assess the freshness of data by measuring latency from receivers' perspectives. AoI is defined as the time elapsed since the latest useful piece of information that reached its intended destination and that has been generated at its source.

According to another example, the at least one utilization scheme S1 comprises at least one transmission repetition frequency, a least one subband, at least one modulation and coding scheme.

According to a further example, the at least one utilization scheme S1 comprises a set of radio resources of the at least one radio channel RCH to be used for transmission by UE#1.

Shown is a first apparatus UE#1 comprising at least one processor; and at least one memory including computer program code; the at least one memory and the computer program code configured to, with the at least one processor, cause the apparatus UE#1 at least to perform: collecting 102 at least one first radio traffic data set DA#1 that is associated with a utilization of at least one radio channel RCH during a first period of time; training 104 a machine-trainable function T1#1 based on the collected at least one first radio traffic data set DA#1, wherein a machine-trained function F1#1 is obtained; collecting 106 at least one second radio traffic data set DB#1, which is associated with the utilization of the at least one radio channel RCH, wherein the second traffic data set DB#1 is different from the first data set DA#1; determining 108, using the machine-trained function F1#1, at least one utilization scheme S1#1 associated with the at least one radio channel RCH based on the at least one second radio traffic data set DB#1; allocating 110*a-b* at least one radio resource on the at least one radio channel RCH according to the determined utilization scheme S1#1; and transmitting 112*a-d* data via the at least one allocated radio resource of the at least one radio channel RCH.

There is shown a method for operating the second apparatus gNB#2, UE#2 comprising: collecting 202 at least one first radio traffic data set DA#2 that is associated with a utilization of at least one radio channel RCH; training 204 at least one machine-trainable function T1#2 based on the collected at least one first radio traffic data set DA#2, wherein a machine-trained function F1#2 is obtained; collecting 206 at least one second radio traffic data set DB#2, which is associated with the utilization of the at least one radio channel RCH, wherein the second traffic data set DB#2 is different from the first data set DA#1; determining 208, using the trained function F1#2, at least one utilization scheme S1#2 associated with the at least one radio channel RCH based on the at least one second radio traffic data set DB#2; monitoring 210*a-b* the at least one radio channel RCH according to the determined utilization scheme S1#2 for receipt 212*a-d* of data.

For example, there is shown that the training 204 is based on first traffic information tiA#2 of monitored transmissions via the at least one radio channel RCH and based on state information siA#2 associated with the monitored data transmissions.

After the training 104, 204, the trained function parameters p1#1, p1#2 like weights of associaeed neurons of the function T1#1, T1#2 are used in the trained function F1#1. F1#2.

According to an example, related to one of the previous examples, the training 104, 204 is conducted according to a learning trainable model or a deep learning trainable model, where the training phase uses data to adapt the model, having a training model. The training F1#1, F1#2 adapts the model parameters according to a predefined data or from real traffic information, in particular from first traffic information tiA#1, tiA#2. The training is followed by inference, which applies the capability learnt and utilizes the trained model to a new set of data, including a new set of traffic information DB#1, DB#2. The feedback representing instruction e.g., how to select a model, how to re-train a model, or how to impact the model chartarestics or sharing the states of the model.

According to an example, related to one of the previous examples, the learning can be a supervised learning (e.g., relying on labeled data), unsupervised learning (e.g., relying on clustering similarities or building a probabilistic model), or reinforcement learning (e.g., monitoring a dynamic system trying to achieve goals and setup penalty function for not achieving the goals).

Shown is that the determining 208 of the at least one utilization scheme S1#2 is based at least on second traffic information tiB#2, especially different from the first traffic information tiA#2.

For example, there is shown that the method further comprises: determining 244, using the trained function F1#2, at least one quality indicator qi that characterizes the quality of the determined utilization scheme S1#2 associated with the at least one radio channel RCH based on at least one third radio traffic data set DB#3 comprising at least third traffic information tiC#2 of monitored transmissions via the at least one radio channel RCH; determining 246 at least one rectification indicator ri if the quality indicator qi passes a quality threshold qiTH; and transmitting 240 the at least one rectification indicator ri indicating at least one change associated with at least one of the training configuration tc, the collecting configuration cc, the function execution configuration fc, and the utilization scheme type configuration uc.

In case of the threshold qiTH for the determined quality indicator qi is predicted to be exceeded (i.e., an acceptable accuracy/error is exceeded by plus/minus configured delta-error, which is known/configured for each loose/up-to/accurate model), it is assumed that both nodes UE#1 and gNB#2/UE#2 reach the same decision.

Technical standards, e.g., 3GPP/IEEE/ETSI and/or specifications can recommend the parameters and/or the parameter values that indicate a certain model/methods that should be used in each node. I.e., when the base-station shares these values, parameters, the UEs are inherently mandating one model or a class of models to use. E.g., A learning parameter may be configured and shared by the base-station/network, which gets a value from 1 to N, wherein each of these values refers to a suggested model(s) to be used in the other node.

In another example the model or function is selected from a class of models or functions with different complexity and/or accuracy (i.e., from loose up to very accurate/complex). Once a model or function is selected at Base-station gNB#2 (node 1)[say model-X], a corresponding model or function is selected at the UE UE#1 [say model-X'], where in model-X' can be of a less accuracy or a loose model. When the threshold qiTH is exceeded once, the base-station gNB#1 monitors the escalation happening at UE#1. If the escalation was over-estimated, the Base-station gNB#2 triggers UE#1, for example via the learning exchange channel, to select a more accurate and complex model, say model-X". When the UE UE#1 did not escalate for a detected error (threshold exceeding) at the base-station gNB#2, the base-station gNB#2 also triggers the UE UE#1 to select a more accurate/complex model. In this case, rectification of an error is conducted by informing the UE UE#1 about inappropriate escalation by means of feedback.

According to an example, integrity monitoring is there at the base-station gNB#2 (the learning leading node) which calculates an error margin that controls the simultaneous learning. The error margin, when it is 0, it means a full synchronization and harmonization between the two nodes, the gNB#2 and UE#1. In such a case, is expected that both nodes learn simultaneously and exactly.

In order to quantify such an error margin, it is set to multiple values, between 0 and 1, where each value may lead to a different rectification procedure. However, the easier thing to have only two error margin 1 or 0, where 0 means no error detected in the escalation process and 1 means one error detected (either a UE didn't escalate when it is needed or vice versa).

According to a first example of the system, UE#1 is a user equipment or radio terminal, gNB#2 is a radio access node, the radio channel RCH is an uplink channel, and the feedback channel FCH is a downlink channel.

According to a second example of the system, UE#1 is a user equipment or radio terminal, UE#2 is a user equipment or radio terminal, the radio channel RCH is a sidelink channel, and the feedback channel FCH is also the sidelink channel.

Figure 2:
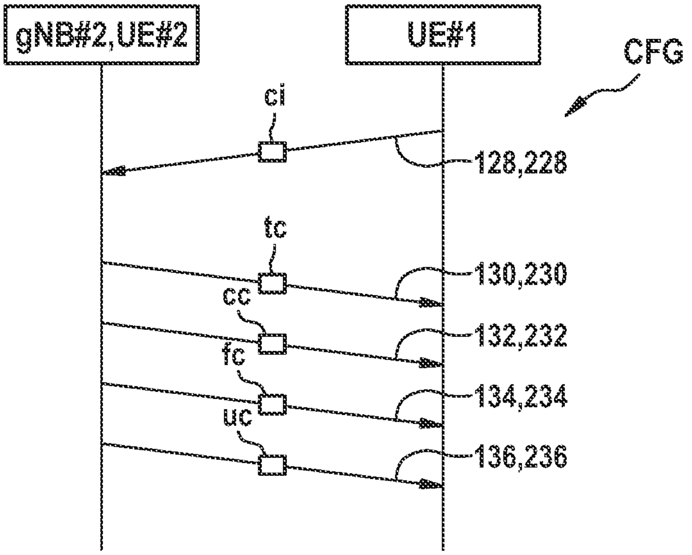
FIG. 2 depicts a configuration mode in another schematic sequence diagram, according to an example embodiment of the present invention.

FIG. 2 depicts a schematic sequence diagram for configuring UE#1. There is shown that the method further comprises: transmitting 128, in a configuration mode CFG, at least one capability indicator ci.

For example, the capability information associated with the capability indicator ci indicates at least one of available trainable functions, available parameters for the trainable functions, and available radio resource sets. In other words, the AI training and execution capabilities are conveyed to the central entity.

UE#1 shares its capability of whether UE#1 supports training and using the trained function or not (if not, the field may not exist). If supporting the use of the trained function UE#1 indicates its AI capabilities, which comprise at least one of the following: a) which functions are supported and/or can be configured for inference execution; b) whether UE#1 performs data collection, wherein the capability indicates a value that allows gNB#2/UE#2 to configure the training time and/or time scale; c) whether UE#1 supports an inference based on either internally trained parameters or based on passed parameters, e.g., downloaded from the gNB#2 or the network, wherein the UE#1 capability also indicates an inference execution time, where the capability indicates a value that allows gNB#2/UE#2 to configure the training time and/or time scale.

There is illustrated that the method further comprises: receiving 130, for example as a response to the transmitted at least one capability indicator ci, a training configuration tc; wherein the training 104 of the machine-trainable function T1#1 is configured according to the received training configuration tc.

The training configuration comprises, for example, a function selection indicator indicating a selection of the trainable function T1#1 from a plurality of trainable functions. In the training mode, the trainable function is selected by UE#1 from the plurality of trainable functions according to the function selection indicator. In other words, the configuration of the function or model is set by the gNB#2. Alternatively or additionally, the function or model selection is shared/suggested by UE#1, where a confirmation of the model or function is sent back to UE#1.

For example, a quality-rating indicator as part of the training configuration is transmitted to UE#1. The rating quality indicator indicates or is a threshold for comparing a quality rating output of a trained representation of the trainable function. If the quality rating output satisfies or reaches the rating quality indicator, then the representation is selected or marked as trained.

The quality rating comprises, for example, at least one threshold or at least one range of values for assessing the quality of the radio channel.

There is depicted that the method further comprises: receiving 132, for example as a response to the transmitted at least one capability indicator ci, a collecting configuration cc; wherein the collecting 102, 106 is configured according to the received collecting configuration cc.

The collecting configuration cc is for example a restriction or filter for the data being the source for the determination of the collected state information. For example, the collecting configuration cc is or comprises one or more limitations to select the data from which the nodes can simultaneously learn using the same selected model or function. In other words, the collecting configuration cc restricts the set of data that is the basis for the determination of the at least one radio traffic data set DA#1, DB#1.

In a further example, the collecting configuration cc defines a time horizon or time period for taking into account the data for determining the at least one collected state information.

In a further example, the collecting configuration cc indicates loss/accuracy associated with data that is the basis for the determination of the at least one data collection parameter.

There is shown that the method further comprises: receiving 134, for example as a response to the transmitted at least one capability indicator ci, a function execution configuration fc; wherein the determining 108 of the at least one utilization scheme S1#1 is configured according to the received function execution configuration fc.

For example, the at least one function execution configuration fc comprises a function configuration parameter like weights of the function F1#1. The function execution configuration parameter is sent to instruct UE#1 how and which parameters to consider when executing the trained function F1#1. Advantageously, the function execution configuration parameter mandate using similar model parameters at both UE and gNB, for example.

gNB#2 and UE#1 share parameters for learning like starting weights of the trainable function or model which can be specified in a standardization design, wherein the at least one configuration parameter is sent to instruct UE#1 how and which parameters to consider for training the function and/or using the function.

The data training set, length, and specification is either configured by UE#1 or suggested by UE#1 by means of the at least one data collection parameter. A confirmation of the at least one data collection parameter is sent back to UE#1. Based on the at least one data collection parameter both UE#1 and gNB#2, UE#2 collect state information that is assumed to be identically or at least collected uniformly at both nodes UE#1 and gNB#2, UE#2. The collecting comprises to aggregate at least one or more of the following: Existing information about the channel state, shared information about the channel state, reproduced information about the channel state, estimated information about the channel state, measured information about the channel state at each node UE#1 and gNB#2, UE#2.

The figure concerns that the method further comprises: receiving 136, for example as a response to the transmitted at least one capability indicator ci, at least one utilization scheme type configuration uc; and wherein the training 104 is conducted based on the at least one received utilization scheme configuration uc.

There is shown that the method for operating gNB#2/UE#2 further comprises: receiving 228, in a configuration mode CFG, the at least one capability indicator ci.

For example, there is shown that the method further comprises: transmitting 230, for example as a response to the received at least one capability indicator ci, a training configuration tc; wherein the training 204 of the machine-trainable function T1#2 is configured according to the transmitted training configuration tc.

Shown is that the method further comprises: transmitting 232, for example as a response to the received at least one capability indicator ci, a collecting configuration cc; wherein the collecting 202, 206 is configured according to the transmitted collecting configuration cc.

For example, there is shown that the method further comprises: transmitting 234, for example as a response to the received at least one capability indicator ci, a function execution configuration fc; wherein the determining 208 of the at least one utilization scheme S1#2 is configured according to the transmitted function execution configuration fc.

The figure concerns that the method further comprises: transmitting 236, for example as a response to the received at least one capability indicator ci, at least one utilization scheme type configuration uc; and wherein the training 204 is conducted based on the at least one transmitted utilization scheme configuration uc.

Figure 3:
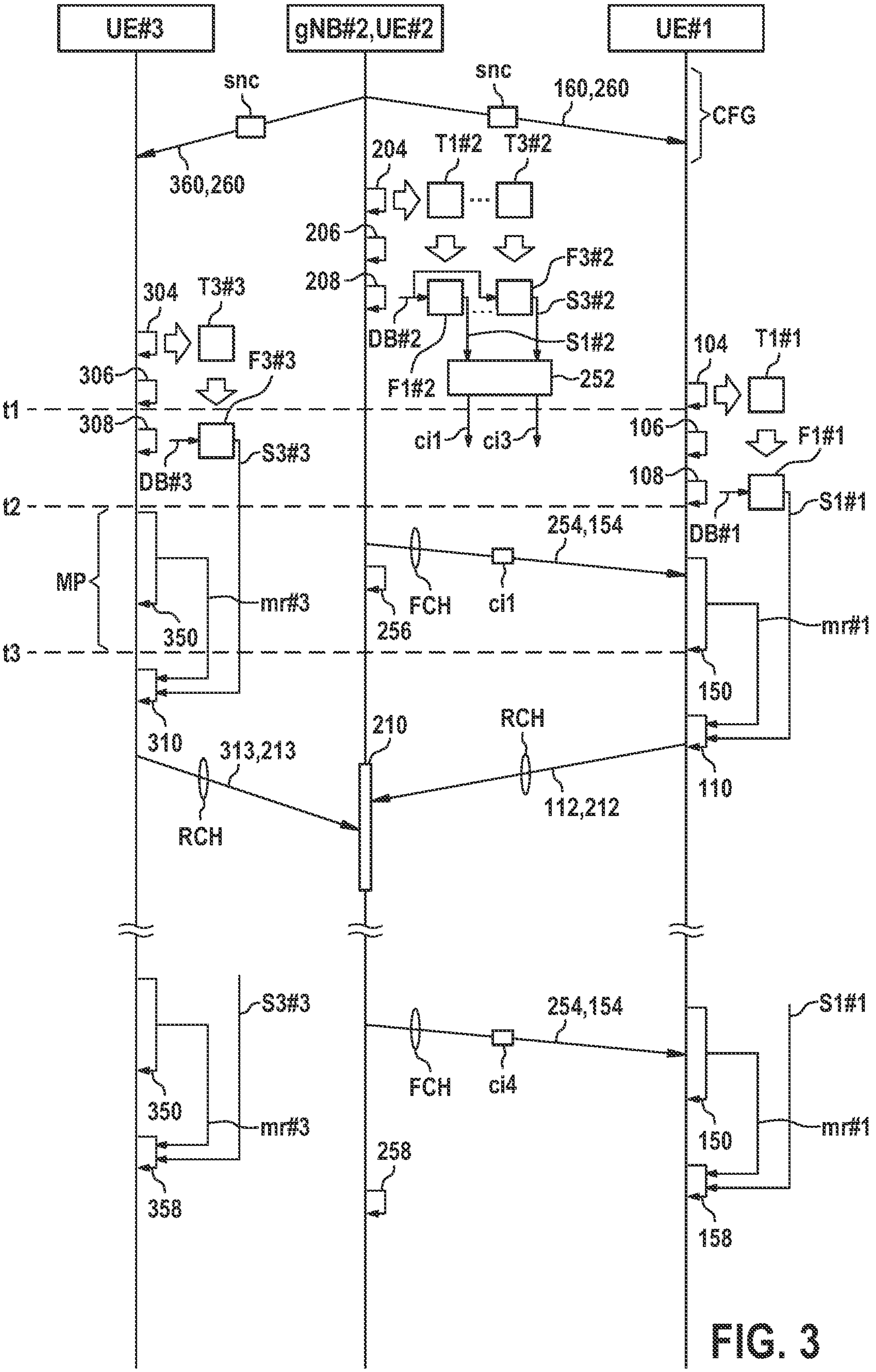
FIG. 3 depicts a further schematic sequence diagram for operating apparatuses of a radio communications network, according to an example embodiment of the present invention.

FIG. 3 depicts a further schematic sequence diagram. There is shown a method for operating a first apparatus UE#1, UE#3 comprising: training 104, 304 at least one trainable function T1#1, T3#3 that is associated with the first apparatus UE#1, UE#3 and that is associated with at least one radio channel RCH, and obtaining at least one trained function F1#1, F3#3 from the training 104, 304; collecting 106, 306 at least one radio traffic data set DB#1, DB#2 that is associated with a utilization of the at least one radio channel RCH; determining 108, 308, using the at least one trained function F1#1, F3#3, at least one utilization scheme S1#1, S3#3 that is associated with the first apparatus UE#1, UE#3 based on the collected at least one radio traffic data set DB#1, DB#3; monitoring 150, 350 whether at least one conflict control indicator ci1 is received 154, and determining at least one monitoring result mr#1, mr#3 from the monitoring 150; allocating 110, 310 radio resources of the at least one radio channel RCH based on the monitoring result mr#1, mr#3 and based on the determined utilization scheme S1#1, S3#1; and transmitting 112, 313 data via the allocated radio resources of the at least one radio channel RCH.

Moreover, UEs of the cell of the radio access network are aligned and coordinated via relaxing and/or controlling their time-line to perform AI/use the trained function and achieve results in no-conflicting manners. Accordingly, a resource allocation/resource management procedure is conducted autonomously (assisted by AI-based/capable devices) reducing collisions and reducing competition on radio resources on the at least one radio channel RCH.

There is illustrated that the at least one conflict control indicator ci1 indicates at least one change request associated with the determined utilization scheme S1#1; and wherein the allocating 110 of the radio resources is further based on the change request.

With reference to FIG. 3, FIG. 2 concerns that the at least one conflict control indicator ci1 indicates at least one of a permission for the apparatus UE#1 to use a permitted set per#1 of radio resources of the at least one radio channel RCH and a prohibition for the apparatus UE#1 to use a prohibited set pro#1 of radio resources of the at least one radio channel RCH; and wherein the allocating 110 of the radio resources of the at least one radio channel RCH is based on the determined utilization scheme S1#1 and based on at least one of the permitted set per#1 of radio resources and the prohibited set pro#1 of radio resources.

The provided timeline and AI/ML processing capability (based on the signaled UE capability indication) together with the at least one control indicator ci1 enables gNB#2/UE#2 to assist UE#1 that is involved in simultaneous/parallel learning process to avoid using a determined utilization scheme S that involves overlapping resources, beam mapping, etc., on shared resources.

The conflict control indicator ci1 reduces the risk that, if the trained functions are going to provision, over-provision, or escalate resources, gNB#1 may grant some free/non-overlapping resources where UE#1 may have the chance to select from without impacting or overlapping over another UE in the network (e.g., UE2) that could be simultaneously provisioning/over-provisioning/or escalating resource allocation/resource management procedure simultaneously.

According to an example, UE#1 is requested by gNB#2/UE#2 to relax its processing time to allow gNB#2/UE#2 to align the determined utilization schemes of at least a part of the plurality of UEs in its associated radio communications network. In this case, gNB#2/UE#2 predicts UE requirements and tries to confine the UEs in non-overlapping resources as much as possible. The time relaxation may be selected based on the UE required quality of services. gNB#2/UE#2 assists the other UEs comprising UE#1 in time scale that enhances the performance of the UEs with high QoS requirements.

Shown is that the method further comprises: receiving 160, 360 a synchronization indicator snc, which indicates at least one point in time t3; and wherein the transmitting 112, 313 of the data is started after the at least one point time t3.

Shown is that the received synchronization indicator snc indicates a monitoring period MP for the monitoring 150, 350, the monitoring period MP comprising the at least one point in time t3, wherein the monitoring 150, 350 is conducted at least during the monitoring period MP. The monitoring period MP is arranged between the training and inference of the trainable/traind functions to allow the central entitiy like gNB#2/UE#2 to adapt the respective utilization schemes S that are used by UE#1 and UE#3. This adaption is conveyed via explicit signalling or implicit avoidance of signals that indicate a control over the distributely determiend utilization schemes S.

The figure concerns that the at least one received conflict control indicator c1 indicates, as part of the monitoring result mr#1, an acknowledgement for the determined utilization scheme S1#1; and wherein the radio resources are allocated 110 according to the determined and acknowledged utilization scheme S1#1.

There is shown that the monitoring result mr#3 indicates an acknowledgement via a no receipt of a negative acknowledgement for the determined utilization scheme S3#3 or via a no receipt of a change request for the determined utilization scheme S3#3; wherein the radio resources are allocated 310 according to the determined and acknowledged utilization scheme S3#3.

There is shown that the at least one conflict control indicator ci4 indicates, as part of the monitoring result mr#1, a negative acknowledgement for the determined utilization scheme S1#1; and avoiding 158 the allocation of the radio resources according to the determined not acknowledged utilization scheme S1#1.

For example, there is shown that the monitoring result mr#3 indicates a negative acknowledgement via a no receipt of an acknowledgement for the determined utilization scheme S3#3 or via a no receipt of a change request for the determined utilization scheme S3#3; and avoiding 358 the allocation of the radio resources according to the determined utilization scheme S3#3.

There is depicted the first apparatus UE#1, UE#3 comprising at least one processor; and at least one memory including computer program code; the at least one memory and the computer program code configured to, with the at least one processor, cause the first apparatus UE#1 at least to perform: training 104, 304 the at least one trainable function T1#1, T3#3 that is associated with the first apparatus UE#1, UE#3 and that is associated with at least one radio channel RCH, and obtaining the at least one trained function F1#1, F3#3 from the training 104, 304; collecting 106, 306 the at least one radio traffic data set DB#1, DB#2 that is associated with a utilization of the at least one radio channel RCH; determining 108, 308, using the at least one trained function F1#1, F3#3, the at least one utilization scheme S1#1, S3#3 that is associated with the first apparatus UE#1, UE#3 based on the collected at least one radio traffic data set DB#1, DB#3; monitoring 150, 350 whether the at least one conflict control indicator ci1 is received 154, and determining at least one monitoring result mr#1, mr#3 from the monitoring 150; allocating 110, 310 the radio resources of the at least one radio channel RCH based on the monitoring result mr#1, mr#3 and based on the determined utilization scheme S1#1, S3#1; and transmitting 112, 313 the data via the allocated radio resources of the at least one radio channel RCH.

There is shown a method for operating the second apparatus gNB#2, UE#2 comprising: training 204 a plurality of trainable functions T1#2, T3#2 that are associated with different remote apparatuses UE#2, UE#3 and that are associated with at least one radio channel RCH, and obtaining a plurality of trained functions F1#2, F3#2 from the training 204; collecting 206 at least one radio traffic data set DB#2 that is associated with a utilization of the at least one radio channel RCH; determining 208, using the plurality of trained functions F1#2, F3#2, a plurality of utilization schemes S1#2, S3#2 that are associated with a respective one of the different remote apparatuses UE#1, UE#3; determining 252, based on the plurality of utilization schemes S1#2, S3#2, at least one conflict control indicator ci1, ci3, that indicates a potential future radio resource conflict or no potential future conflict on the at least one radio channel RCH; transmitting 254 the at least one conflict control indicator ci1, especially of a transmit type, or omitting 256 the transmission of the at least one conflict control indicator ci3, especially of an omit type; and monitoring 210, after the transmission 254 or omission 256 of the at least one conflict control indicator ci1, ci3, the at least one radio channel RCH for receipt 212, 213 of data from at least one of the remote apparatuses UE#1, UE#3 based on the determined plurality of utilization schemes S1#2, S3#2 and based on the at least one conflict control indicator ci1, ci3.

There is shown that the determining 252 of the at least one conflict control indicator ci comprises: comparing the plurality of utilization schemes S1#2, S3#2, wherein a comparison result comprises at least one of a permission for at least one of the apparatuses UE#1, UE#3 to use a permitted set per#1 of radio resources of the at least one radio channel RCH, and a prohibition for at least one of the apparatuses UE#1, UE#3 to use a prohibited set pro#1 of radio resources of the at least one radio channel RCH; and wherein the at least one control indicator ci1 indicates at least one of the permitted set per#1 of radio resources and the prohibited set pro#1 of radio resources.

The figure concerns that the method further comprises: transmitting 260 the synchronization indicator snc, for example as part of the configuration mode CFG, wherein the synchronization indicator snc indicates at least one point in time t3; and wherein the receipt 212, 213 of the data as part of the monitoring 210 is expected after the at least one point time t3.

For example, there is shown that the transmitted synchronization indicator snc indicates the monitoring period MP for the monitoring 210 for receipt 212, 213, the monitoring period MP comprising the at least one point in time t3, wherein the monitoring 210 is conducted at least during the monitoring period MP.

There is illustrated that the at least one transmitted conflict control indicator c1 indicates an acknowledgement for the associated one of the utilization schemes S1#1; and wherein the radio resources of the at least one radio channel RCH are monitored 210 for receipt 212 according to the determined and acknowledged utilization scheme S1#2.

Shown is that a no transmission of a negative acknowledgement for the determined utilization scheme S3#2 or a no transmission of a change request for the determined utilization scheme S3#2 indicates an acknowledgement; wherein the radio resources of the at least one radio channel RCH are monitored 210 for receipt 212 according to the determined and acknowledged utilization scheme S3#2.

The figure concerns that the at least one conflict control indicator ci4 indicates a negative acknowledgement for the determined utilization scheme S1#2; and avoiding 258 the allocation of the radio resources according to the determined not acknowledged utilization scheme S1#2.

The figure concerns that a no transmission of an acknowledgement for the determined utilization scheme S3#3 or a no transmission of a change request for the determined utilization scheme S3#3 indicates a negative acknowledgement; avoiding 258 the allocation of the radio resources according to the determined and not acknowledged utilization scheme S3#3.

For example, based on the determined utilization schemes S1#2 and S3#2 and based on the determined at least one conflict control indicator ci1, ci3, a set of receipt radio resources per remote apparatus UE#1, UE#3 are determined. The receipt radio resources are monitored 210.

An example concerns the second apparatus gNB#2, UE#2 comprising at least one processor; and at least one memory including computer program code; the at least one memory and the computer program code configured to, with the at least one processor, cause the second apparatus gNB#2, UE#2 at least to perform: training 204 the plurality of trainable functions T1#2, T3#2 that are associated with different remote apparatuses UE#2, UE#3 and that are associated with at least one radio channel RCH, and obtaining the plurality of trained functions F1#2, F3#2 from the training 204; collecting 206 at least one radio traffic data set DB#2 that is associated with the utilization of the at least one radio channel RCH; determining 208, using the plurality of trained functions F1#2, F3#2, the plurality of utilization schemes S1#2, S3#2 that are associated with the respective one of the different remote apparatuses UE#1, UE#3; determining 252, based on the plurality of utilization schemes S1#2, S3#2, at least one conflict control indicator ci1, ci3, that indicates the potential future radio resource conflict or no potential future conflict on the at least one radio channel RCH; transmitting 254 the at least one conflict control indicator ci1, especially of the transmit type, or omitting 256 the transmission of the at least one conflict control indicator ci3, especially of an omit type; and monitoring 210, after the transmission 254 or omission 256 of the at least one conflict control indicator ci1, ci3, the at least one radio channel RCH for receipt 212, 213 of data from at least one of the remote apparatuses UE#1, UE#3 based on the determined plurality of utilization schemes S1#2, S3#2 and based on the at least one conflict control indicator ci1, ci3.

At a point in time t1, UE#1, UE#3 start to conduct their AI/ML procedure wherein t1 can be configured by the network or gNB#2/UE#2. Additionally, t1 can be same for all UEs, i.e., all UEs are synchronized and start the AI/ML procedure together, or t1 has a different starting point at each UE, e.g., based on scheduling requirements or based on UE capability.

At a point in time t2, gNB#2/UE#2 is sure about its scheduling/resource management prediction for at least a part of the UEs in its reach and which are involved in the synchronize/simultaneous AI/ML process. gNB#2/UE#2 sends a coordination information/resource assignment assisting information for all UEs in form of a respective conflict control indicator in order to prepare UE#1 and UE#3 to escalate or provision more resource/beams/cells/etc as part of the utilization scheme. At t2, gNB#2/UE#2 is ready to distribute its assisting information in form of the conflict control indicator intended to reach UE#1 and UE#2 during and before elapsing MP at t3. After t3, AI/ML inference is conducted in addition to a preconfigured relaxation time.

Point in time t3 is the time after which UE#1, UE#3 are ready with their AI/ML execution with possible deployment of AI/ML results, being successfully passing all processing delays (based on UE capability) and/or all relaxation time, which is, for example, configured by the network or preconfigured in the UE initially.

In order to align the UE timeline with other UEs, the UE may be requested by the gNB and/or network to indicate a UE Capability RRC configuration (for AI) which carries the following fields:

- Information about supported models
- Supported training time for the supported data/data collections
- Supported inference/supported execution time (in values or steps or relaxed to slots) for each covered supported model
- Supported initial relaxed time gap (depends on the UE configuration/initial capability)
- Supported mode of extending or further relaxing the time gap until the UE/gNB is/are completely sure about execution been done at the UE(s).

The time relaxation in form of MP is selected based on the required quality of services via the at least one radio channel RCH. In this case, the gNB will try to assist the UEs in time scale that enhances the performance of the UEs with high QoS requirements. This process is not visible to the UE.

Figure 4:
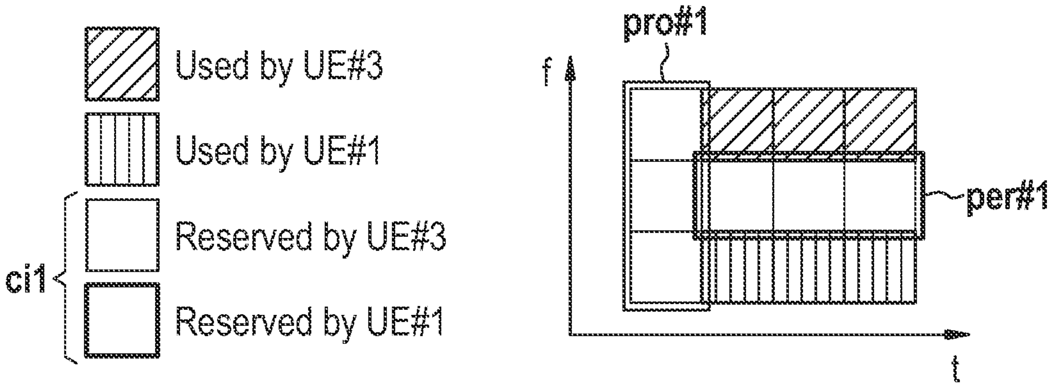
FIG. 4 depicts schematically a conflict control indicator and a radio resource grid, according to an example embodiment of the present invention.

FIG. 4 depicts schematically a radio resource grid. For UE#1 of FIG. 3, the conflict control indicator ci1 indicates the further radio resources per#1 exclusively reserved for transmissions originating from UE#1 and the other radio resources pro#1 that are not to be used by UE#1 due to an exclusive reservation for transmissions from UE#3.

If UE#1 and UE#3 compete over resources without an idealistic or without relaxed non-overlapping resource for future allocation from the network, then UE#1 and UE#3 are allowed to provision on a confined set of shared resources. This situation may result in deciding for UE#1 and UE#3 to use the same resources. This can result in collision on the at least one radio channel RCH, in particular the uplink channel. However, in the downlink case, one UE may only be admitted to these conflicting resources to avoid collision in DL which, however, may induce outage on the other UE, i.e., which has not been selected during the resolution of the conflicting resource.

Figure 5:
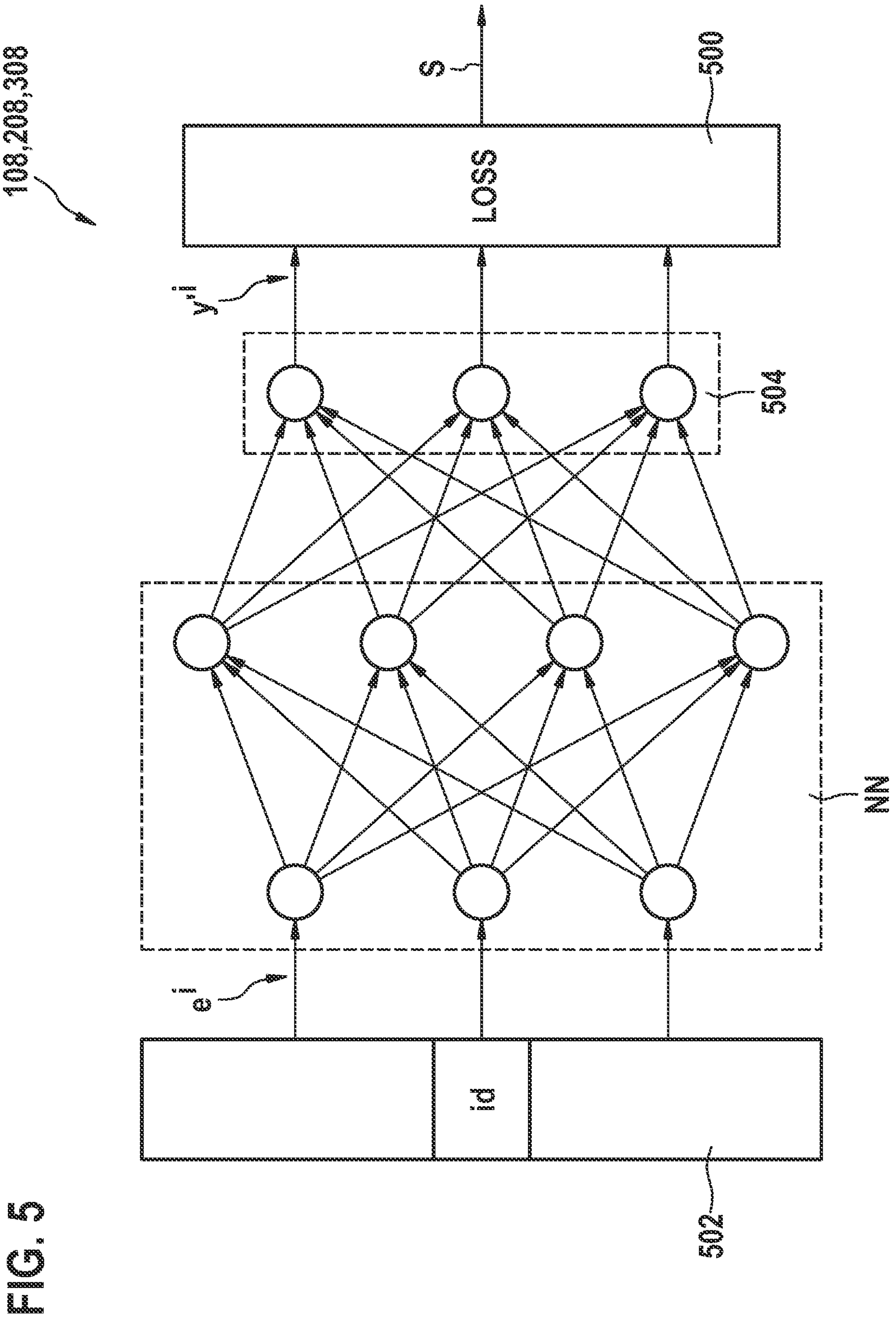
FIG. 5 depicts schematically a trained function and how it is used, according to an example embodiment of the present invention.
Figure 6:
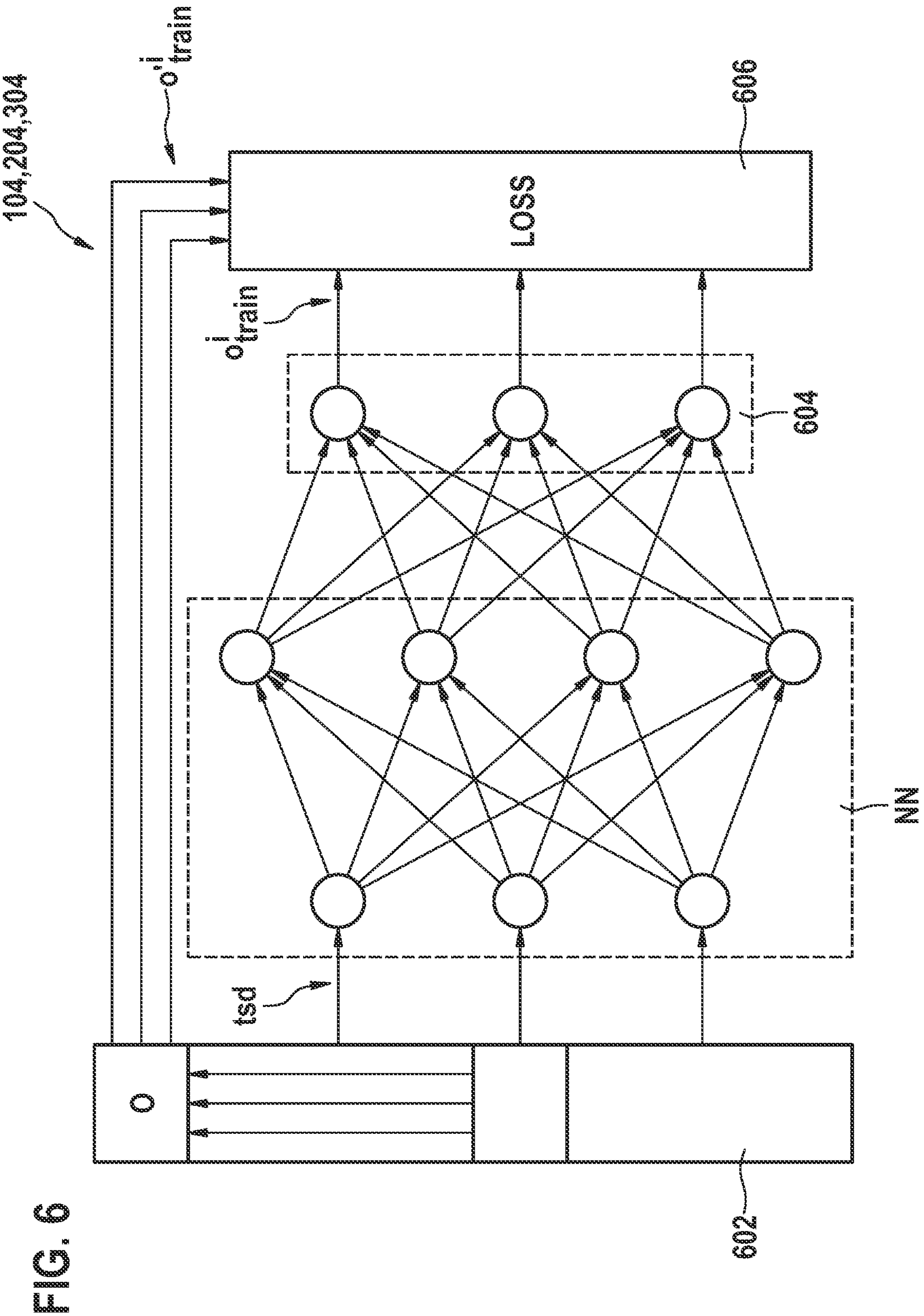
FIG. 6 depicts schematically how to train a trainable function, according to an example embodiment of the present invention.

FIG. 5 depicts a schematic arrangement for determining 108, 208, 308 a tensor $y'^{I}$ representing the utilization scheme S like S1#1, S1#2 or S3#2, S3#3 for transmissions originating from the first or third apparatus UE#1, UE#3. The determination 108, 208, 308 is conducted via a neural network NN, which represents the trained function F like F1#1, F1#2, F3#3, F3#2, etc. of the previous FIGS. 1 and 3, based on the second radio traffic data set DB like DB#1, DB#2, or DB#3 represented by the tensor $e^{i}$. The neural network NN therefore maps a first radio traffic data set to the at least one communication parameter cP. An arrangement for the training 104, 204, 304 is shown in FIG. 6. First, the training is referred to.

The first radio traffic data set DA like DA#1, DA#2, or DA#3 represents or is part of a training set is that is provided in the form of input data id by an input interface 602. The arrangement comprises the artificial neural network NN with an input layer. For a time step i, an input tensor of the input data id is passed to the input layer. The input layer is part of the input section. For input data id, the output O is determined in the form of a prediction or is known beforehand. In time step i a tensor with observed values $o^{i}_{train}$ is determined from the output O, which are assigned to the observed values of the tensor $e^{i}_{train}$. The output O comprises the at least one utilization scheme. Each of the time series of input data id is assigned to one of three input nodes. In a forward path of the artificial neural network NN, the input layer is followed by at least one hidden layer. In the example, a number of nodes of the at least one hidden layer is greater than a number of the input nodes. This number is to be regarded as a hyper parameter. In the example, four nodes are provided in the hidden layer. The neural network NN, for example, is learned by the gradient descent method in the form of backpropagation. The training of the neural network NN is therefore supervised.

In the forward path in the example, an output layer 604 is provided after at least one hidden layer. Prediction values are output at output layer 604 of the output section of the neural network NN. In the example, an output node is assigned to each prediction value.

In each time step i a tensor $o''^{i}_{train}$ is determined in which the prediction values for this time step i are contained. In the example, this is fed to a training function 606 together with the column vector of the observed values $o^{i}_{train}$ of the at least one communication parameter cP. The training function 606 is designed in the example to determine a prediction error by means of a loss function LOSS, in particular by means of a mean square error, and to train the model with it and by means of an optimizer, for example an Adam optimizer. The loss function LOSS is determined in the example depending on a deviation, in particular the Mean Square Error, from the values of the tensor of the observed values oitrain and the tensor of the prediction values $o''^{i}_{train}$.

The training is ended as soon as a criterion is reached. In the example, the training is aborted if the loss does not decrease over several time steps, i.e. the Mean Square Error in particular does not decrease.

Test data is then entered into the model trained in this way. The model is generated by the training with the training data td. The model is evaluated with the test data in order to determine a test error, in particular with regard to the mean value $\mu$ and covariance $\Sigma$, to see how well a model performs.

According to the arrangement shown in FIG. 5, the machine-trained or machine-learned function in the form of the neural network NN is used to provide a prediction in form of the at least one utilization scheme S. An input interface 502 applies the input data id as the tensor ei to the input layer of the neural network NN. The same data preprocessing steps are performed as for the training data. For example, scaling and a determination of input and output data takes place. This determination takes place in the example during the operation of the apparatuses UE#1, gnB#2/UE#2, i.e. during the operation of the radio communications network.

The input data id that are entered into the trained artificial neural network NN. Depending on this, prediction values are determined. A determination score is determined depending on this.

As described for the training, a column vector $e^{i}$ is passed to the input layer for the input data id. The column vector is then passed to the input layer. Afterwards, in contrast to training, a determination device 500 determines the utilization scheme S depending on the prediction values y'i provided by an output layer 504 of the neural network NN.

In particular, instructions of a computer program implementing the described neural network NN are provided for the implementation of the described procedures. Dedicated hardware can also be provided, in which the trained function is mapped.

Figure 7:
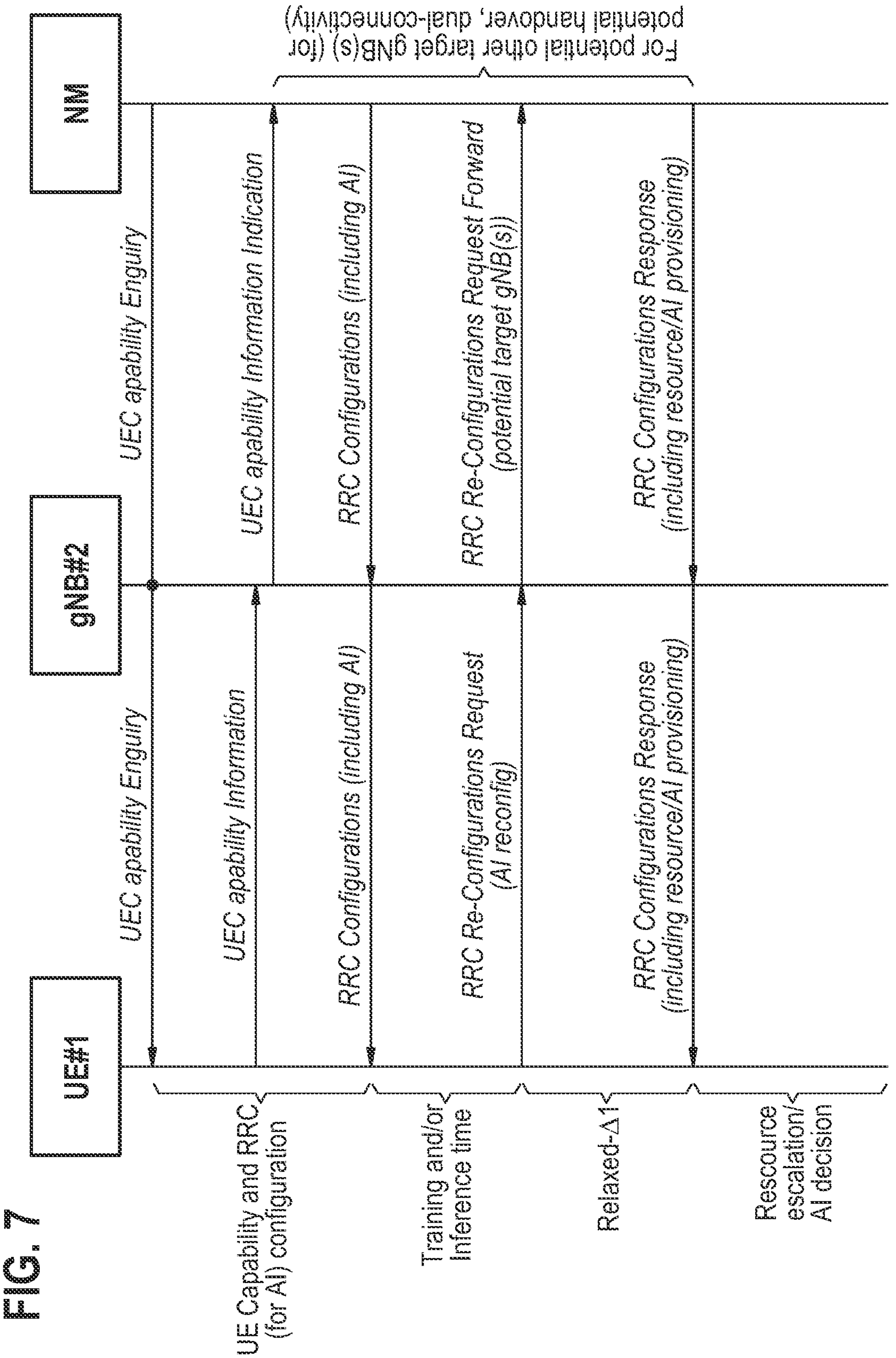
FIG. 7 depicts an interaction between a network managing entity, a gNB, and an UE, according to an example embodiment of the present invention.

FIG. 7 depicts an interaction between a network managing entity NM, gNB#2, and UE#1. The interaction comprises enquiry and response for sharing UE#1 capability to allow the network to align between the UE#1 exploiting its preconfigured Training and/or Inference time (based on the UE capability) in addition to a possibly (optionally) configured relaxed time to guarantee alignment of UEs in the network and, according to an example, being assisted by the gNB#2/UE#2.

The network managing entity NM requests UE#1 to transmit its capability information. Based on the capability information an RRC configuration is determiend by NM and transmitted towards UE#1. If UE#1 determines during training of the machine-trainable function or execution of the machine trained function that the outcome, for example in form of the utilization scheme, does not have the required quality for being used, the an RRC Re-Configuration is requested by UE#1. NM determines a different further RRC configuration and transmits the ruttier RRC confuguration to UE#1. After this the Artificial Intelligence, AI, decision in form of the utilization scheme indicates a resource escalation, that is, UE#1 will use an increased amount of radio resources as compared with a period before.

Figure 8:
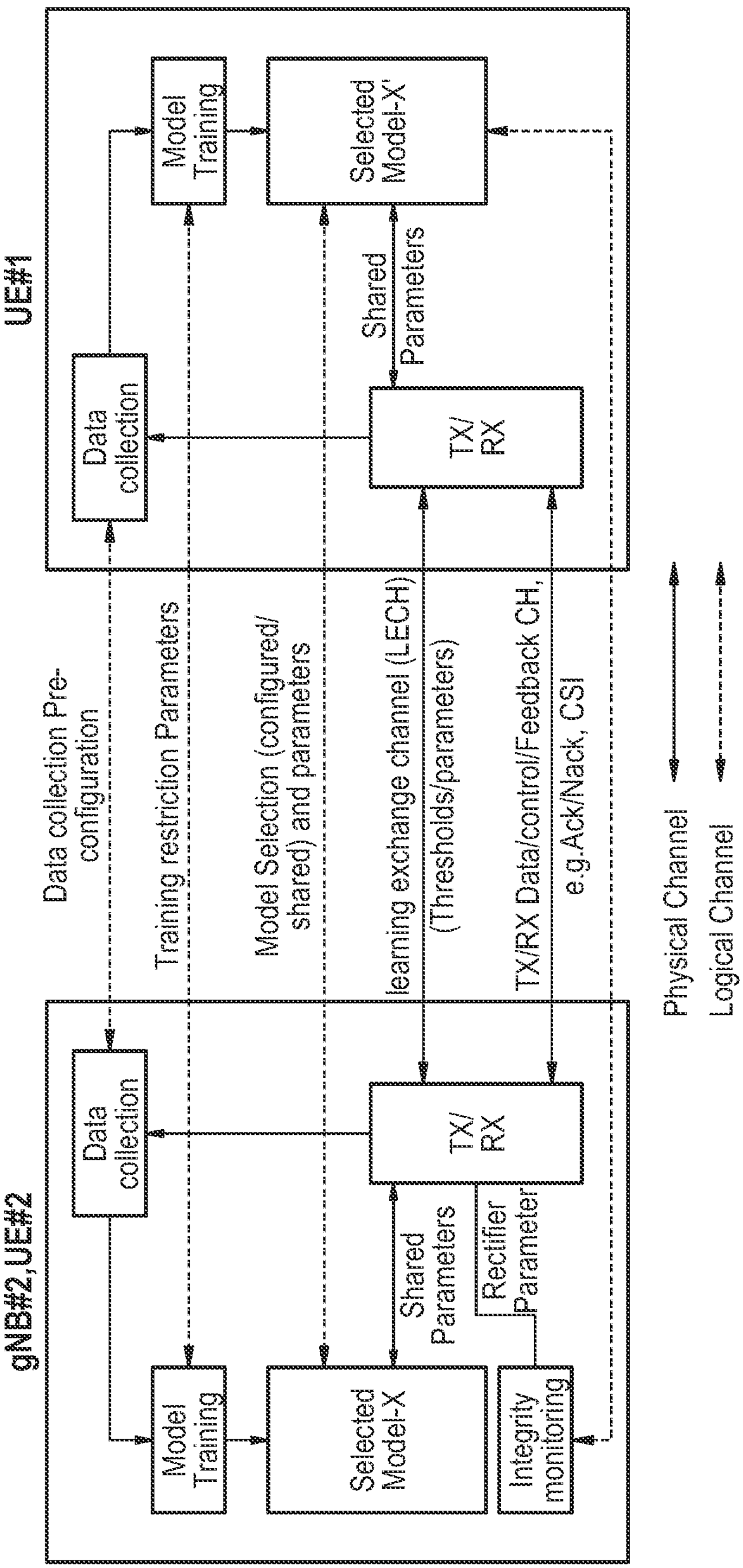
FIG. 8 depicts in a schematic block diagram a data collection, model sharing and restricted training, according to an example embodiment of the present invention.

FIG. 8 depicts in a schematic block diagram a data collection, model sharing and restricted training between the two nodes. The apparatuses UE#1 and gNB#2/UE#2 share parameters and, additionally, also collected data for joint but separately executed prediction or determination of the utilization scheme associated with UE#1. The shared parameters mandate, for example: using similar models or corresponding (equivalent) models at both UE#1 and gNB#2/UE#2. For example, function X' and function X can be identical or equivalent. In this case, a joint/collaborative AI/ML between the two nodes, namely UE#1 and gNB#2/UE#2, is designed to: 1) Share the model or function like its structure among UE/gNB via a dedicated control channel or AI/ML control channel; 2) Share the parameters and possible collected data for joint (simultaneous or parallelized and synchronized) prediction, where parameters can be: a) a set of value(s) to allow the node to select the same model as the other node (X) or an equivalent model (X'); b) the parameters can also define the horizon and loss/accuracy c) Weights of the model/function, which are sent to instruct the node, in this case could be one of the noded (e.g., the UE), to adapt its model.

A physical transceiver model assumes that data can be conveyed between the two devices and, additionally, AI/ML feedback channel is configured. The AI/ML feedback channel can be embedded in an existing control channel, i.e., included in a field presenting an AI/ML control and configuration parameter or conveyed in a separate control channel, e.g., L1 or L2 channel. If the latter is considered, i.e., L2 channel, a MAC control element (MAC CE) is transmitted in the MAC frames or an RRC control information containing the configuration and/or control data. If L1 channel is considered, the AI/ML configuration/control information needs to be part of the downlink/uplink control information (DCI/UCI), or it can be a separate physical channel, e.g., learning exchange channel (LECH).

Figure 9:
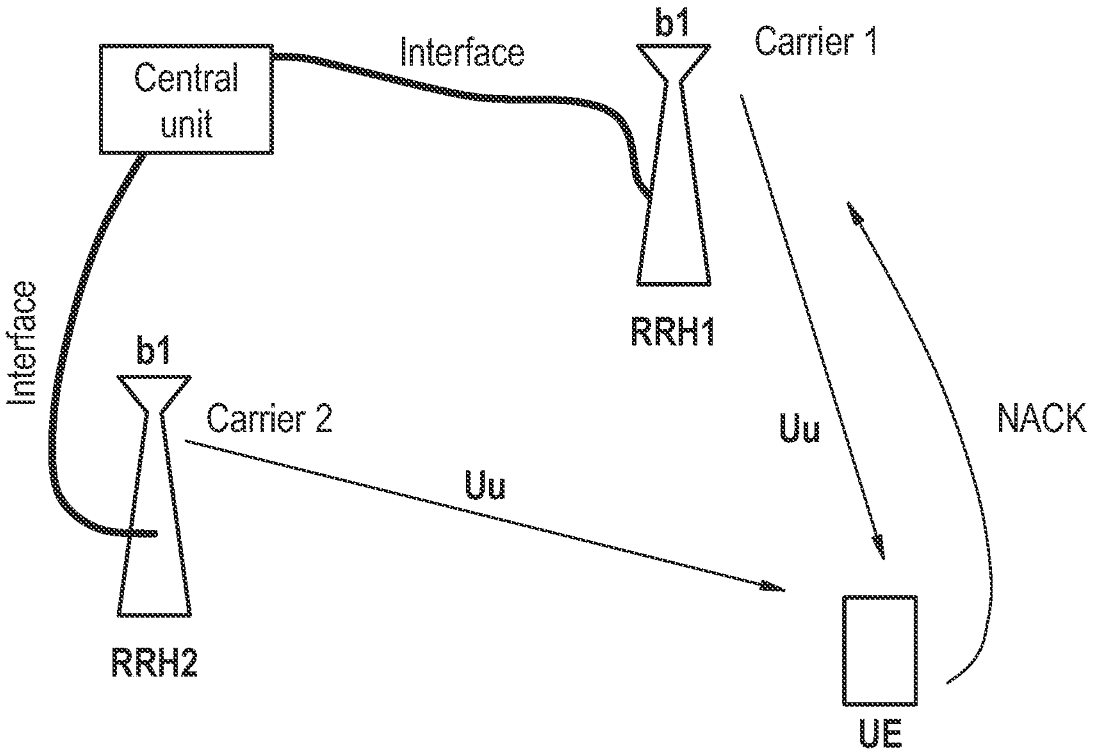
FIG. 9 depicts a radio situation of the radio communications network, according to an example embodiment of the present invention.

FIG. 9 depicts a radio situation of the radio communications network and a possible escalation process via learning-based autonomous carrier aggregation/multi-connectivity. Both, gNB and UE activate aggressive transmission based on a certain threshold.

Figure 10:
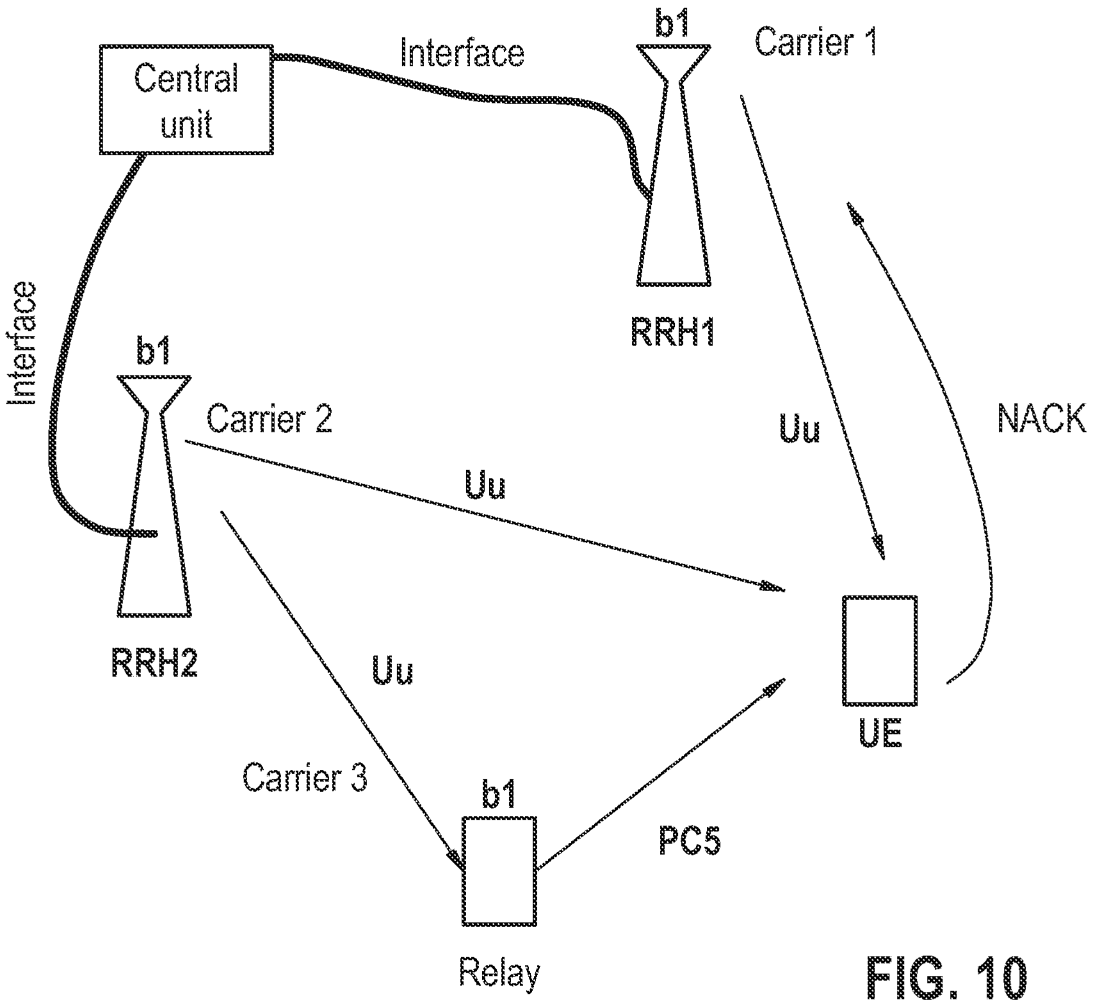
FIG. 10 depicts another radio situation of the radio communications network, according to an example embodiment of the present invention.

FIG. 10 depicts another radio situation of the radio communications network and a relay activation based on simultaneous learning. UE and the Relay are trained with the same or nearly the same data (estimated, fed back or reproduced) as the base-station, where UE and Relay are also learning simultaneously with the base-station. When the error or accuracy threshold is exceeded on both UE and Relay, assuming they are simultaneously learning, Relay enables simultaneously a redundant relay to UE. This model or function can be extended to many relays assuming they can all simultaneously learn.

Figure 11:
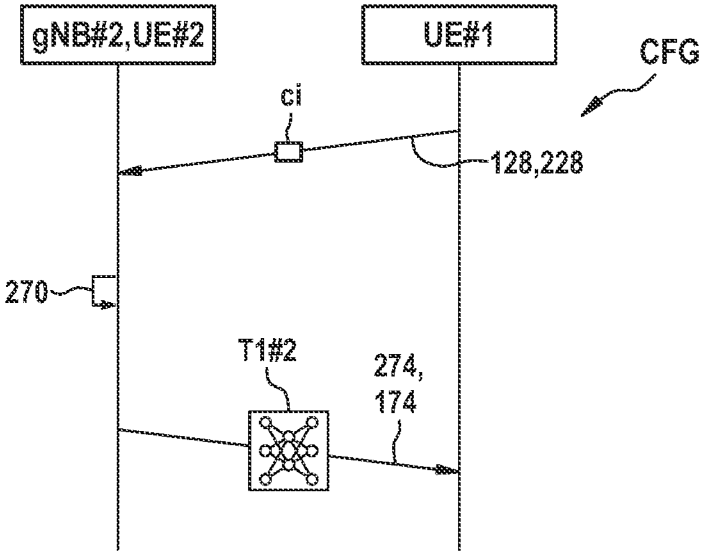
FIG. 11 depicts the configuration mode in another schematic sequence diagram, according to an example embodiment of the present invention.

FIG. 11 depicts an example of at least a part of the configuration mode CFG in a schematic sequence diagram. The capability indicator ci indicates at least a model transfer capability of the UE. gNB#2, UE#2 selects the trainable function T1#2 for usage on both sides, that ist gNB#2, UE#2 and UE#2, and transmits 274 the trainable function T1#2 or parameters describing the trainable function T1#2 to UE#1. In summary, three approaches are discussed in this description:

Solution 1: collaboration without model transfer, i.e., relying on sharing some parameters for the possible cooperation;

Solution 2: full cooperation with model transfer and parameter sharing; and

Solution 3: Adaptable collaboration based on context/status signaling.

In order to align the UE AI/ML process with the base-station (without loss of generality, it is named in this report after gNB), the UE may be requested by the gNB and/or network to indicate its UE AI/ML related capability in fields conveyed via, e.g., RRC configuration (e.g., specific for AI/ML functionalities), which carries the following fields (not limited to): Information about supported models; Supported training time; Supported data collections fields/types/etc.; Supported model transfer options (Training data only, Training data and model, etc.); Supported inference/supported execution time/complexity/accuracy (e.g., in general or for each model); Supported mode of eact or further relaxing approaches based on accuracy; Supported set of parameters transfer, including, e.g. batch size, step size, momentum, back-propagation method (e.g., including loss functions, etc.); Supported adapted/adaptable collaboration level for AI/ML based on Non-UE-status/UE initiated based, e.g., based on network decision or AI performance decision (as monitored by gNB), UE-status/UE-based adaptive collaboration, including, e.g.:UE (Status) based: indication requested by the UE due to: e.g., the battery type/status, AI supported capabilities, internal UE prioritization/internal UE buffer/internal UE processing race/etc. Note: Capability fields and configurations may be conducted by RRC messages. The UE and/or the network may initiate specific request (in any sequence) to assist the UE capability indication and UE configuration.

Solution 1: Collaboration Without Model Transfer:

In case the model is not shared explicitly, wherein the collaboration should be termed as the both following items: A-Model-agnostic collaboration B-Model-specific collaboration.

A-Model-Agnostic Collaboration

Here the idea is that the actual model structure (including the neural structure) of the used AI/ML model in one node is not known to the other party (i.e., the other node). Herein, the collaboration is only possible with respect to the inference performance of the both models, e.g., how the two, which may be different, can converge and reaches similar precision. Therefore, collaboration could imply one or more of the following variants:Enhanced data collection variant: wherein the training data is shared and exchanged. For sharing training data, a specific container is defined and configured for passing the said values. The training data container Training data container values {The model input; The desired model output} In general, the specification should provide a dedicated AI/ML training data channel, which could either be a dedicated control channel (MAC CE or dedicated RRC), physical shared channel, etc., e.g., AI/ML training physical channel feedback-AI/ML training channel container (e.g., a MAC CE). Wherein training data is downloaded (from NW/basestation to UE) or uploaded via these possible channel/feedback alternatives. Inference performance variant: the inference performance of the models at both ends is compared—in case simultaneous/shared learning is performed. Therefore we define a performance container consisting of: Inference accuracy container value {1. The accuracy of the model (e.g., in percentage, in value between 0-1, etc.) 2. Suggestion of changing the model (enabled/disabled)}. Wherein the field Suggestion of changing the model may alter one node (specifically a UE terminal node) to change its selected (arbitrary model) if the accuracy reaches a certain threshold, which is (pre)configured by, e.g., the network. This field could also implicitly executed if the (pre)configuration includes a triggering threshold, e.g., If the accuracy_of_the_model.value>(pre)_configured_threshold UE internally triggered to select another model, e.g., sophisticated (if accuracy is not accepted) or relaxed (e.g., to save power if accuracy is >acceptance criteria)

It is up to the UE implementation to modify the model if it is implicitly triggered as above.

In general, the specification should provide a dedicated control channel for signaling a UE with Inference accuracy container value, or a group-common control channel for signaling a UE with Inference accuracy container value B-Model-Specific Collaboration In this case, the model, i.e., the architecture is known (via, e.g., hinting, implicit or explicit signaling (as for referring to (pre)configured models); however, the actual model itself is not transferred. In this sense, the collaboration could rely on a new or adapting existing control channel that defines and transfers the training parameters (parameters used while training), such as:batch size, step size, momentum, back-propagation method (e.g., including loss functions, etc.) etc. In turn, assuming that the same training data are used, it can be achieved that the same performance is achieved without the need to transfer the entire model.

Solution 3: Adaptive Collaboration Levels

As the gNB is able to assess the capabilities of the UE, e.g., based on the UE capability initially signaled between the said two nodes. Based on this, an initial collaboration between the two nodes is conducted until further signaling. Herewith, the gNB may be able to additionally signal to the UE different collaboration based on some context information change (e.g., new AI model for specific situation, which the gNB is selecting and it (the model) requires different collaboration level). Coordination level is (as decided by gNB) should allows coordination with other UEs in the network, wherein the adaptation of the cooperation level of node 1 (our said UE) is important to keep the network harmonized. Based on UE status, if the UE capability is requesting/allowing adaptive collaboration based on actual status, actual need by the said UE, e.g.: the battery type, AI supported capabilities, the battery type/status, internal UE prioritization/internal UE buffer/internal UE processing race/etc. etc. In this case, it is required to specify more collaboration levels, where every level has a specific role of the UE and gNB and allows to adjust the level of collaboration according to standardized definition. One level would a set of roles for the UE that matches the remaining roles at the gNB.

What is claimed is:

1. A method for operating a first apparatus, comprising performing the following steps by the first apparatus:

collecting at least one first radio traffic data set that is associated with a utilization of at least one radio channel;

training a machine-trainable function based on the collected at least one first radio traffic data set, to obtain a machine-trained function;

collecting at least one second radio traffic data set, which is associated with the utilization of the at least one radio channel, wherein the second traffic data set is different from the first data set;

determining, using the machine-trained function, at least one utilization scheme associated with the at least one radio channel based on the at least one second radio traffic data set;

allocating at least one radio resource on the at least one radio channel according to the determined utilization scheme; and transmitting data via the at least one allocated radio resource of the at least one radio channel.

2. The method according to claim 1, wherein the training is based on first traffic information of monitored transmissions via the at least one radio channel and based on state information associated with the monitored data transmissions.

3. The method according to claim 1, wherein the determining of the at least one utilization scheme is based at least on second traffic information, different from the first traffic information.

4. The method according to claim 1, wherein the method further comprises:

receiving at least one rectification indicator indicating at least one change associated with at least one of: a configuration of the training, a configuration of the collecting, a configuration of a function execution, and a configuration of a utilization scheme type; and applying the at least one indicated change.

5. The method according to claim 1, further comprising:

transmitting, in a configuration mode, at least one capability indicator.

6. The method according to claim 5, further comprising:

receiving, as a response to the transmitted at least one capability indicator, a training configuration;

wherein the training of the machine-trainable function is configured according to the received training configuration.

7. The method according to claim 5, further comprising:

receiving, as a response to the transmitted at least one capability indicator, a collecting configuration;

wherein the collecting is configured according to the received collecting configuration.

8. The method according to claim 5, further comprising:

receiving, as a response to the transmitted at least one capability indicator, a function execution configuration;

wherein the determining of the at least one utilization scheme is configured according to the received function execution configuration.

9. The method according to claim 5, further comprising:

receiving, as a response to the transmitted at least one capability indicator, at least one utilization scheme type configuration; and wherein the training is conducted based on the at least one received utilization scheme configuration.

10. The method according to claim 5, further comprising:

receiving the machine-trainable function or at least one parameter including a weight of the machine-trainable function, as a response to the transmitted at least one capability indicator.

11. A first apparatus, comprising:

at least one processor; and at least one memory including computer program code;

wherein the at least one memory and the computer program code configured to, with the at least one processor, cause the first apparatus at least to perform the following steps:

collecting at least one first radio traffic data set that is associated with a utilization of at least one radio channel, training a machine-trainable function based on the collected at least one first radio traffic data set, to obtain a machine-trained function, collecting at least one second radio traffic data set, which is associated with the utilization of the at least one radio channel, wherein the second traffic data set is different from the first data set, determining, using the machine-trained function, at least one utilization scheme associated with the at least one radio channel based on the at least one second radio traffic data set, allocating at least one radio resource on the at least one radio channel according to the determined utilization scheme, and transmitting data via the at least one allocated radio resource of the at least one radio channel.

12. A method for operating a second apparatus, comprising performing the following steps by the second apparatus:

collecting at least one first radio traffic data set that is associated with a utilization of at least one radio channel;

training at least one machine-trainable function based on the collected at least one first radio traffic data set, to obtain a machine-trained function;

collecting at least one second radio traffic data set, which is associated with the utilization of the at least one radio channel, wherein the second traffic data set is different from the first data set;

determining, using the trained function, at least one utilization scheme associated with the at least one radio channel based on the at least one second radio traffic data set; and monitoring the at least one radio channel according to the determined utilization scheme for receipt of data.

13. The method according to claim 12, wherein the training is based on first traffic information of monitored transmissions via the at least one radio channel and based on state information associated with the monitored data transmissions.

14. The method according to claim 12, wherein the determining of the at least one utilization scheme is based at least on second traffic information different from the first traffic information.

15. The method according to claim 12, further comprising:

determining, using the trained function, at least one quality indicator that characterizes a quality of the determined utilization scheme associated with the at least one radio channel based on at least one third radio traffic data set including at least third traffic information of monitored transmissions via the at least one radio channel;

determining at least one rectification indicator when the quality indicator passes a quality threshold; and transmitting the at least one rectification indicator indicating at least one change associated with at least one of: a configuration of the training, a configuration of the collecting, a function execution configuration, and a utilization scheme type configuration.

16. The method according to claim 12, further comprising:
receiving, in a configuration mode, at least one capability indicator.

17. The method according to claim 16, further comprising:
transmitting, as a response to the received at least one capability indicator, a training configuration;
wherein the training of the machine-trainable function is configured according to the transmitted training configuration.

18. The method according to claim 16, further comprising:
transmitting, as a response to the received at least one capability indicator, a collecting configuration;
wherein the collecting is configured according to the transmitted collecting configuration.

19. The method according to claim 16, further comprising:
transmitting, as a response to the received at least one capability indicator, a function execution configuration;
wherein the determining of the at least one utilization scheme is configured according to the transmitted function execution configuration.

20. The method according to claim 16, further comprising:
transmitting, as a response to the received at least one capability indicator, at least one utilization scheme type configuration; and
wherein the training is conducted based on the at least one transmitted utilization scheme configuration.

21. The method according to claim 16, further comprising:
receiving the machine-trainable function or at least one parameter including a weight of the machine-trainable function, as a response to the transmitted at least one capability indicator.

22. A second apparatus, comprising:
at least one processor; and
at least one memory including computer program code;
the at least one memory and the computer program code configured to, with the at least one processor, cause the second apparatus at least to perform the following steps:
collecting at least one first radio traffic data set that is associated with a utilization of at least one radio channel;
training at least one machine-trainable function based on the collected at least one first radio traffic data set, to obtain a machine-trained function;
collecting at least one second radio traffic data set, which is associated with the utilization of the at least one radio channel, wherein the second traffic data set is different from the first data set;
determining, using the trained function, at least one utilization scheme associated with the at least one radio channel based on the at least one second radio traffic data set; and
monitoring the at least one radio channel according to the determined utilization scheme for receipt of data.

* * * * *